US008272917B2

(12) United States Patent
Davis

(10) Patent No.: US 8,272,917 B2
(45) Date of Patent: Sep. 25, 2012

(54) DIRECTIONALLY CONTROLLABLE FLYING VEHICLE AND A PROPELLER MECHANISM FOR ACCOMPLISHING THE SAME

(76) Inventor: Steven Davis, Scapoose, OR (US)

(*) Notice: Subject to any disclaimer, the term of this patent is extended or adjusted under 35 U.S.C. 154(b) by 0 days.

(21) Appl. No.: 13/024,517

(22) Filed: Feb. 10, 2011

(65) Prior Publication Data

US 2011/0143628 A1 Jun. 16, 2011

Related U.S. Application Data

(60) Division of application No. 12/098,853, filed on Apr. 7, 2008, now Pat. No. 8,113,905, which is a continuation-in-part of application No. 11/424,433, filed on Jun. 15, 2006, now Pat. No. 7,497,759, which is a continuation-in-part of application No. 11/106,146, filed on Apr. 14, 2005, now Pat. No. 7,255,623, which is a continuation of application No. 10/924,357, filed on Aug. 24, 2004, now Pat. No. 6,899,586, which is a continuation of application No. 10/647,930, filed on Aug. 26, 2003, now Pat. No. 6,843,699, which is a continuation-in-part of application No. 09/819,189, filed on Mar. 28, 2001, now Pat. No. 6,688,936.

(60) Provisional application No. 60/453,286, filed on Mar. 11, 2003.

(51) Int. Cl.
*A63H 27/127* (2006.01)
(52) U.S. Cl. ......... 446/36; 446/37; 277/17.25; 277/23 B
(58) Field of Classification Search .................... 446/34, 446/46, 48, 36–37; 244/23 A, 23 B, 23 C, 244/23 R, 12.3, 17.23, 17.25, 17.27
See application file for complete search history.

(56) References Cited

U.S. PATENT DOCUMENTS

| 3,568,358 | A | | 3/1971 | Bruce |
| 5,058,824 | A | * | 10/1991 | Cycon et al. ............... 244/17.13 |
| 5,152,478 | A | * | 10/1992 | Cycon et al. ................ 244/12.2 |
| 5,259,729 | A | | 11/1993 | Fujihira et al. |
| 5,297,759 | A | | 3/1994 | Tilbor et al. |
| 5,429,542 | A | | 7/1995 | Britt, Jr. |
| 5,634,839 | A | | 6/1997 | Dixon |
| 5,672,086 | A | | 9/1997 | Dixon |
| 5,971,320 | A | | 10/1999 | Jermyn et al. |
| 6,886,777 | B2 | * | 5/2005 | Rock .......................... 244/17.23 |
| 7,204,453 | B2 | * | 4/2007 | Muren ....................... 244/17.11 |
| 7,789,341 | B2 | * | 9/2010 | Arlton et al. ............... 244/17.23 |
| 2006/0121819 | A1 | * | 6/2006 | Isawa .............................. 446/37 |

FOREIGN PATENT DOCUMENTS

| JP | 63-026355 | 8/1989 |
| WO | WO 99/10235 | 3/1999 |

* cited by examiner

*Primary Examiner* — Dmitry Suhol
*Assistant Examiner* — Alex F. R. P. Rada, II
(74) *Attorney, Agent, or Firm* — Adam K. Sacharoff

(57) ABSTRACT

A flying vehicle in accordance to an embodiment of the present invention includes a propeller control mechanism for flying the vehicle. The propeller control mechanism includes a propeller having a center shaft for connecting to the drive shaft; first and second propeller blades extending from the center shaft; and a control mechanism including a first linkage connecting the center shaft to the first propeller blade and a second linkage connecting the center shaft to a region defined on the propeller, wherein a change in a driving torque of the drive shaft causes the first linkage and the second linkage to change the pitch and height of the propeller blades while substantially unchanging the tip path plane of the propeller blades.

3 Claims, 8 Drawing Sheets

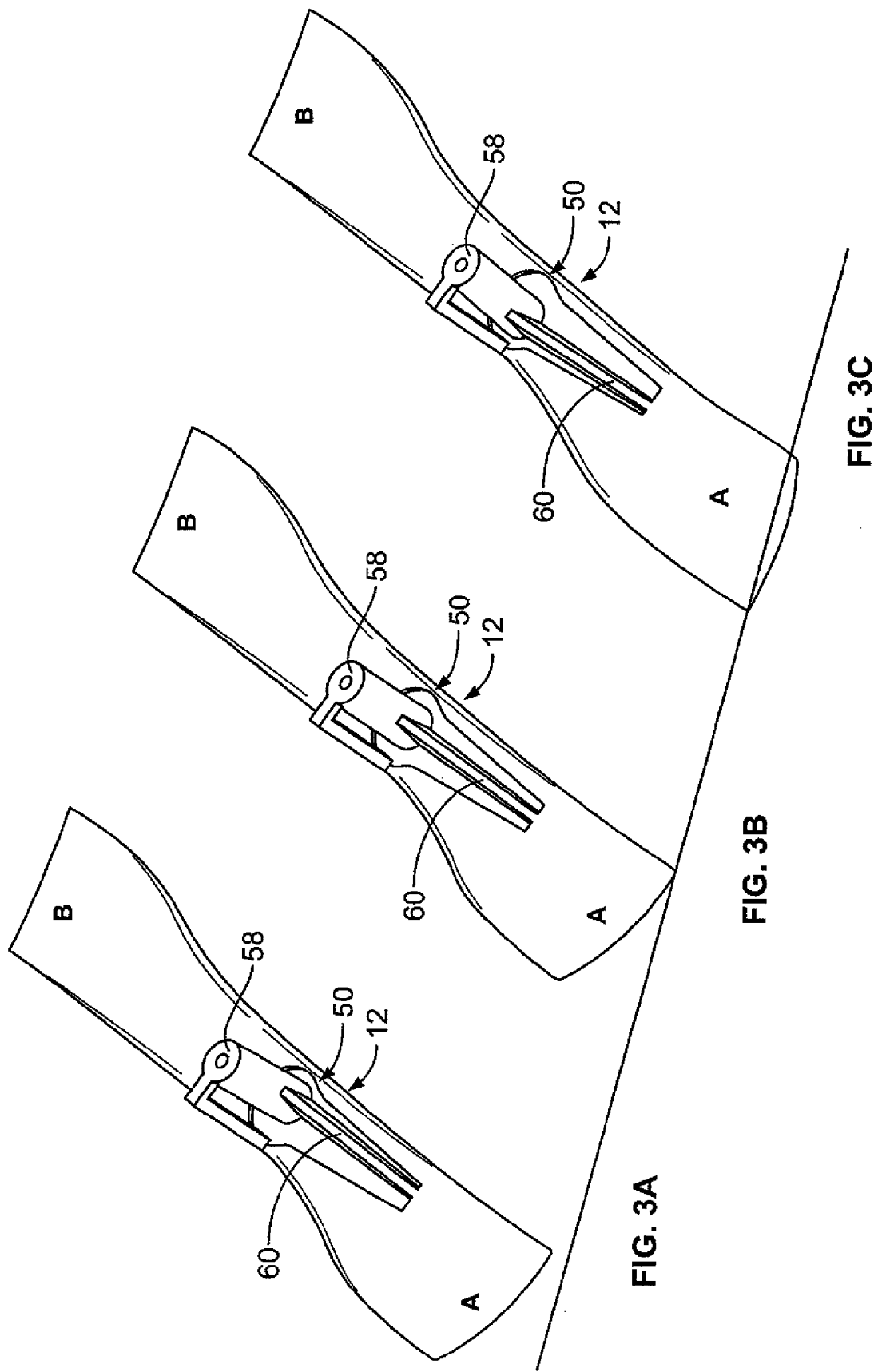

DIRECTIONALLY CONTROLLABLE FLYING VEHICLE AND A PROPELLER MECHANISM FOR ACCOMPLISHING THE SAME

CROSS REFERENCE TO RELATED APPLICATIONS

This application is a division of Ser. No. 12/098,853 filed Apr. 7, 2008, which is a Continuation in Part of Ser. No. 11/424,433 filed Jun. 15, 2006, which is a Continuation In Part of U.S. Pat. No. 7,255,623, which is a continuation of U.S. Pat. No. 6,899,586, which is a continuation of U.S. Pat. No. 6,843,699. U.S. Pat. No. 6,843,699 claims the benefit of U.S. Provisional Application 60/453,283 filed on Mar. 11, 2003 and is a Continuation In Part Application of U.S. Pat. No. 6,688,936. All of which are incorporated by reference.

FIELD OF THE INVENTION

This invention relates to flying vehicles that are directionally controllable flying vehicles and related to a propeller mechanism for accomplishing the same.

BACKGROUND OF THE INVENTION

Most vertical takeoff and landing vehicles rely on gyro stabilization systems to remain stable in hovering flight. For instance, the inventor's previous U.S. Pat. No. 5,971,320 and corresponding International PCT Application WO 99/10235 disclose a helicopter with a gyroscopic rotor assembly to control the orientation or yaw of the helicopter. However, different characteristics are present when the entire body of the vehicle, such as a flying saucer, rotates. Gyro stabilization systems are typically no longer useful when the entire body rotates, for example, see U.S. Pat. Nos. 5,297,759; 5,634,839; 5,672,086; and U.S. Pat. Nos. 6,843,699 and 6,899,586.

However, a great deal of effort is still made in the prior art to eliminate or counteract the torque created by horizontal rotating propellers in flying aircraft in an effort to increase stability. For example, Japanese Patent Application Number 63-026355 to Keyence Corp. provides a first pair of horizontal propellers reversely rotating from a second pair of horizontal propellers in order to eliminate torque. See also U.S. Pat. No. 5,071,383 which incorporates two horizontal propellers rotating in opposite directions to eliminate rotation of the aircraft. Similarly, U.S. Pat. No. 3,568,358 discloses means for providing a counter-torque to the torque produced by a propeller because, as stated in the '358 patent, torque creates instability as well as reducing the propeller speed and effective efficiency of the propeller.

The prior art also includes flying or rotary aircraft which have disclosed the ability to stabilize the aircraft without the need for counter-rotating propellers. U.S. Pat. No. 5,297,759 incorporates a plurality of blades positioned around a hub and its central axis and fixed in pitch. A pair of rotors pitched transversely to a central axis to provide lift and rotation are mounted on diametrically opposing blades. Each blade includes down-turned outer tips, which create a passive stability by generating transverse lift forces to counteract imbalance of vertical lift forces generated by the blades. This helps to maintain the center of lift on the central axis of the rotors. In addition, because the rotors are pitched transversely to the central axis to provide lift and rotation, the lift generated by the blades is always greater than the lift generated by the rotors.

Nevertheless, there is always a continual need to provide new and novel self-stabilizing rotating vehicles that do not rely on additional rotors to counter the torque of a main rotor. Such self-stabilizing rotating vehicles should be inexpensive and relatively noncomplex.

In addition to providing a self-stabilizing rotating vehicle, the ability to provide a simple hovering vehicle that is also controllable greatly enhances the vehicle. When the entire vehicle rotates the vehicle loses an orientation reference, which helps the remote user determine the direction in which the vehicle should move. In helicopters, airplanes, or other typical flying aircraft that have defined front ends or noses, the aircraft has a specific orientation that is predetermined by the nose of the vehicle. In such circumstances a user controlling the aircraft could push a joystick controller forwards (or push a forwards button) to direct the aircraft to travel forwards from its point of reference; similar directional controls are found in conventional remote controlled vehicles. However, when a vehicle completely rotates, such as a flying saucer or any other rotating vehicle, the rotating vehicle loses its orientation as soon as it begins to spin, making directional control difficult to implement. For example, U.S. Pat. No. 5,429,542 to Britt, Jr. as well as U.S. Pat. No. 5,297,759 to Tilbor et al. disclose rotating vehicles but only address movement in an upwards, downwards, and spinning direction; and U.S. Pat. Nos. 5,634,839 and 5,672,086 to Dixon discuss the use of a control signal to direct the rotating vehicle towards or away from the user, thus requiring the user to move about the rotating vehicle to the left or right if the user wants the rotating vehicle to move towards that particular direction.

Furthermore, U.S. Pat. No. 5,259,729 assigned to Keyence Corporation attempted to provide a propeller blade tip path plane inclination device to help control the direction of the vehicle during flight. While this provides a good solution, U.S. Pat. No. 5,259,729 has difficulties. In certain circumstances, movement of the tip plane is undesirable. For example, when the propeller is placed within a circular outer hub with very little top and/or bottom clearance, movement of the tip plane should be prevented to avoid having the tip make contact with other parts of the vehicle. In addition, when the propeller is part of a stacked propeller design inclination must be avoided to prevent the propellers from touching during flight. Embodiments provided herein attempt to solve these difficulties.

SUMMARY OF THE INVENTION

In accordance with an embodiment a controllable flying vehicle is provided. The flying toy includes a main propeller attached to a central hub. The main propeller includes a pair of propeller blades extending from a propeller shaft. A plurality of hub blades is fixed to and extends outwardly and downwardly from the central hub. The main propeller and plurality of hub blades rotate in opposite directions caused by the torque of a motor mechanism used to rotate the main propeller. The hub blades extend from the central hub to an outer ring. The main propeller extends downwardly from the central hub and is positioned below the hub blades such that the end tips of the main propeller lie within the outer ring. The propeller further includes a pair of linkages connecting the propeller to the propeller shaft which is secured to a drive shaft. When the torque of the motor mechanism is changed the pitch and height of the propeller blades also change in such a way to substantially counteract the inclination of the end tips.

In another embodiment a propeller control mechanism for a flying object having a motor for rotating a drive shaft is provided. The propeller control mechanism includes a propeller having a center shaft for connecting to the drive shaft;

first and second propeller blades extending from the center shaft; and a control mechanism including a first linkage connecting the center shaft to the first propeller blade and a second linkage connecting the center shaft to a region defined on the propeller, wherein a change in a driving torque of the drive shaft causes the first linkage and the second linkage to change the pitch and height of the propeller blades such that the tip path plane of the propeller blades remains substantially unchanged.

The second embodiment may further include an open region surrounding the center shaft and the first linkage. The first linkage has a portion thereof positioned in a portion of the open region, wherein the first linkage has a first end attached to the center shaft and a second end attached to a region on the first blade. The second linkage may further have a substantial L shape design that includes a first end connected to the center shaft and a second end connected to the region of the main propeller at a distance below the first end. In addition, the first and second linkages may be flexible. The entire propeller may also be a unitary piece.

In another embodiment of the present invention, there is provided a propeller mechanism that is defined as including a main propeller having a pair of propeller blades extending from a propeller shaft. The propeller blades have end tips. The propeller further includes a pair of linkages connecting the propeller to the propeller shaft which is secured to a drive shaft. When the torque of the motor mechanism is changed the pitch and height of the propeller blades is also changed in such a way to counteract the inclination of the end tips.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein.

DETAILED DESCRIPTION OF THE EMBODIMENTS

Figure 1:
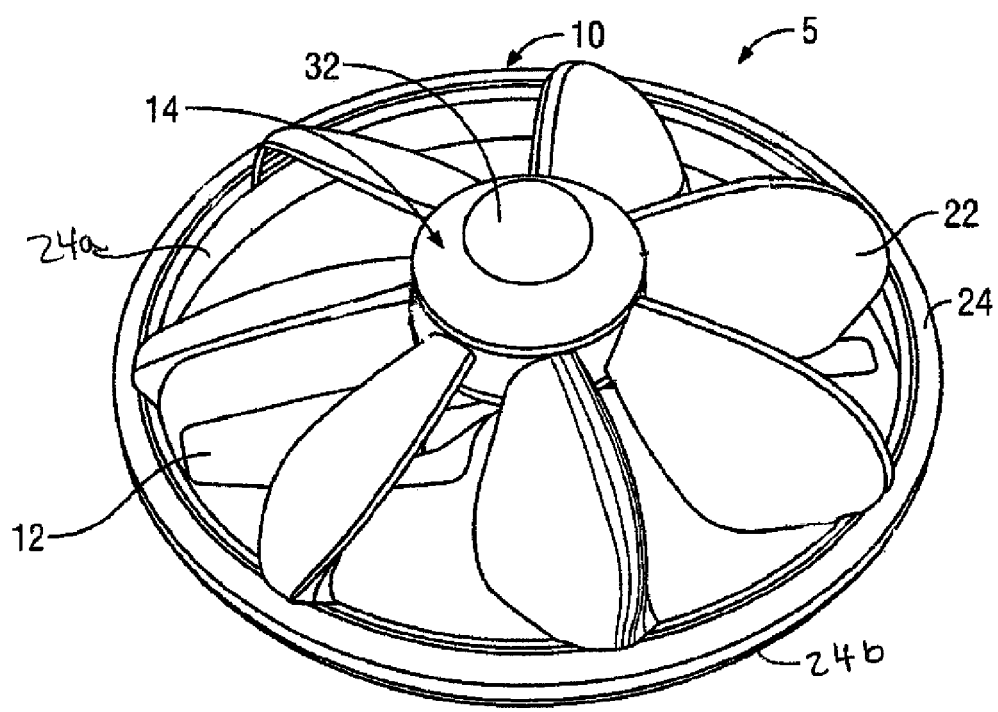
FIG. 1 is a top perspective view of a controllable flying vehicle in accordance with a first embodiment.
Figure 2A:
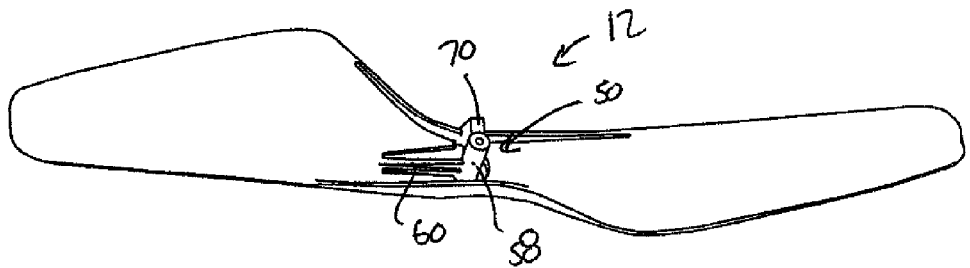
FIG. 2a is a bottom view of the main propeller.
Figure 2B:
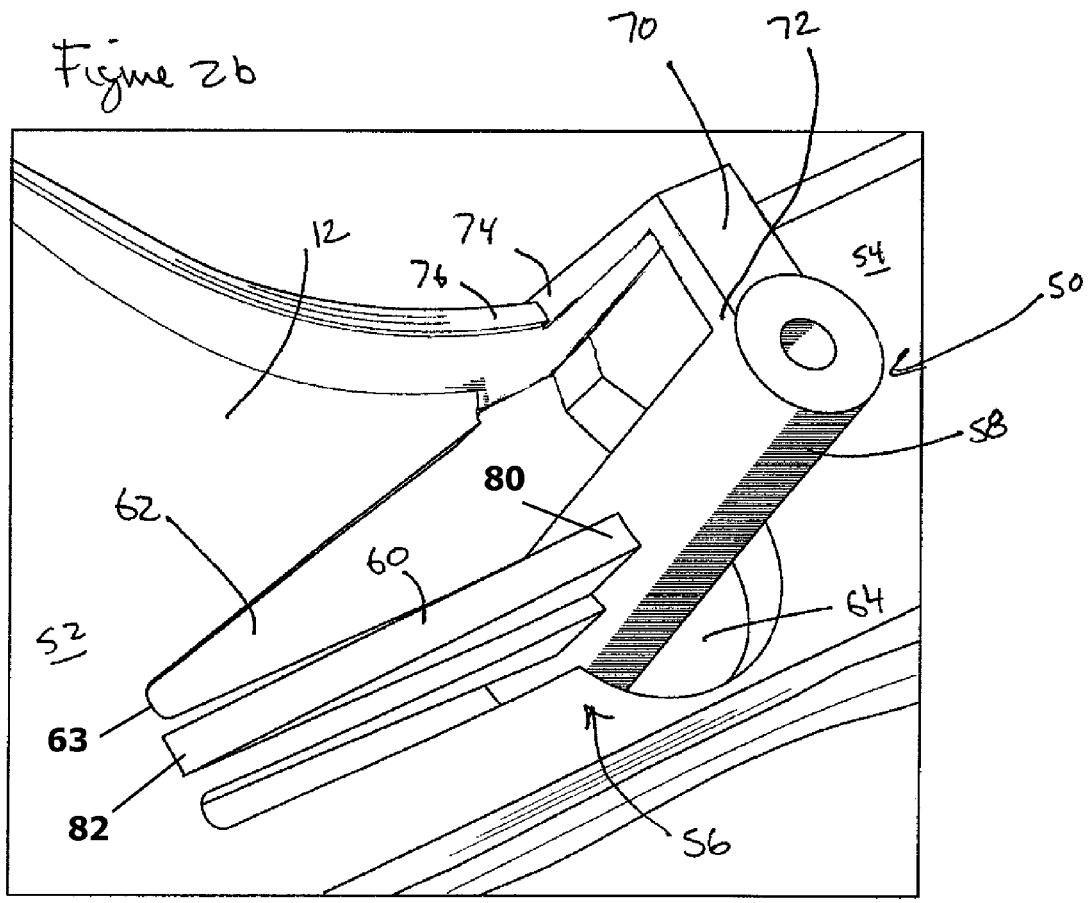
FIG. 2b is a close perspective view of the propeller mechanism.
Figure 2C:
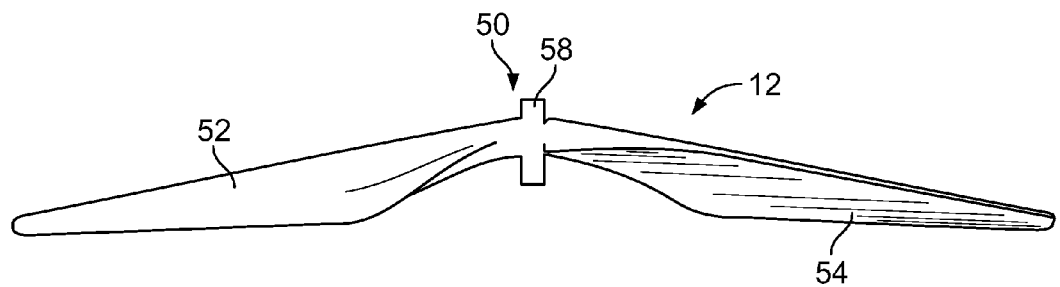
FIG. 2c is a side view of the main propeller.
Figure 2D:
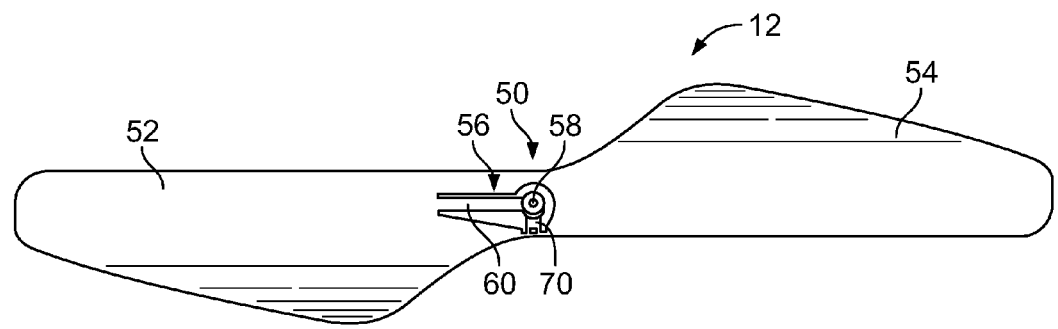
FIG. 2d is a top view of the main propeller.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or claims of the embodiments illustrated.

Referring to FIG. 1, in a first embodiment of the present invention a flying rotating vehicle 5 is provided. The rotating vehicle 5 includes a single main propeller 12 rotatably attached to a light weight counter-rotating main body 10. The counter-rotating main body 10 includes a central hub 14 that contains the drive and control mechanisms. A plurality of blades 22 extend outwardly and downwardly from the central hub 14 to an outer ring 24. The central hub houses a motor mechanism that is used to rotate a main propeller 12. A dome 32 may be positioned on top of the central hub 14 to provide a means for the reception of wireless signals, discussed in one or more of the embodiments below.

As the main propeller 12 rotates, no attempt is made to counter the torque created from the rotating propeller 12. Instead the torque causes the vehicle 5 to rotate in the opposite direction. With sufficient RPMs the rotating vehicle 5 will lift off of the ground or a surface and begin flying. As mentioned above, the outer ring 24 and central hub 14 are connected by the plurality of hub blades 22. The hub blades 22 have lifting surfaces positioned to generate lift as the vehicle 5 rotates. Even though the hub blades 22 are rotating in the opposite direction as the main propeller 12, both are providing lift to the rotating vehicle 5. The hub blades 22 are categorized as counter-rotating lifting surfaces. The induced drag characteristics of the main propeller 12 verses the hub blades 22 can also be adjusted to provide the desired body rotation speed.

The rotating vehicle 5 has the ability to self stabilize during rotation. This self stabilization is categorized by the following: as the rotating vehicle 5 is moved in someway it tilts to one direction and starts moving in that direction. A hub blade, of the plurality of hub blades 22, that is on the preceding side of the rotating vehicle 5 will get more lift than the blade on the receding side. This happens because the preceding blade will exhibit a higher inflow of air than the receding blade. Depending on the direction of rotation, the lift is going to be on one side or the other. This action provides a lifting force that is 90 degrees to the direction of travel. Due to gyroscopic procession a reaction force manifests 90 degrees out of phase with the lifting force. This reaction force opposes movement of the vehicle and thus the rotating vehicle 5 tends to self stabilize. The self-stabilizing effect is thus caused by the gyroscopic procession and the extra lifting force on the preceding blade.

The placement of the center of gravity may also be a contributing factor for self-stabilization. It is believed that the self-stabilizing effect will increase when the CG is positioned above the bottom 24a of the outer ring 24 by a predetermined distance. The predetermined distance above the bottom 24a of the outer ring 24 was further found to be a distance substantially equal to about 10% to 40% of the internal diameter of the outer ring, more preferably to about 15% to 25% of the internal diameter of the outer ring. In addition, since overall weight contributes to the CG position, the CG position is easier to control when the hub blades 22 and outer ring 24 are made from a light-weight material.

The rotating vehicle 5 may also be particularly stable because there is a large amount of aerodynamic dampening caused by the large cross-sectional area of the hub blades 22.

During operation, the main propeller 12 is spinning thus drawing air from above the rotating vehicle downwardly through the counter rotating hub blades 22 within the outer ring 24. The air is thus being conditioned by the hub blades before hitting the main propeller 12. By conditioning the air it is meant that the air coming off the hub blades 22 is at an angle and at an acceleration, as opposed to placing the main propeller 12 in stationary air and having to accelerate the air from zero or near zero. The efficiency of the main propeller 12 is believed to be increased as long as the main propeller 12 is specifically pitched to take the accelerated air into account.

In order to directionally control the rotating vehicle 5, meaning to control the flying rotating vehicle in up/down, forward/backward, and left/right directions, the main propeller 12 includes a novel propeller mechanism that controls the pitch and height of the propeller blades such that the tip path plane is substantially unchanged. As mentioned U.S. Pat. No. 5,259,729 employs a slightly similar concept, however U.S. Pat. No. 5,259,729 requires the tip path plane to incline. If the tip path plane were to substantially change as taught by U.S. Pat. No. 5,259,729 then the tips of the propeller blades would make contact with the underside of the blades 22, which would be undesirable.

Referring now to FIGS. 2a through 2d, there is illustrated the main propeller 12 in various views and also in a close view of the propeller mechanism 50. The main propeller 12 includes a pair of propeller blades 52 and 54 extending outwardly from a center region 56. The center region 56 includes a propeller shaft 58 that attaches to the drive shaft of a motor mechanism. Extending from the propeller shaft 58 is a pair of linkages that control the pitch and height of the propeller blades.

A first linkage, referred to as the pitch control linkage 60 attaches to the propeller shaft 58 approximate to the plane of the propeller blades 52 and 54. The pitch control linkage 60 extends from the propeller shaft 58 and attaches to one 52 of the propeller blades. The propeller blade 52 includes a hollow section 62 surrounding the pitch control linkage 60. The hollow section 62 opens into an aperture 64 that further surrounds the propeller shaft 58. The hollow section 62 and the aperture 64 are provided to allow for the movement of the pitch control linkage 60 as shown and discussed below.

A second linkage, referred to as the height control linkage 70 is secured to the propeller shaft 58 on one end 72 and secured at the other end 74 to a region 76 of the main propeller 12. The height control linkage 70 may also be L shaped such that the end 72 secured to the propeller shaft is positioned below the end 74 secured to the region 76 of the main propeller 12. In other embodiments, the region 76 may be further defined as an edge of the main propeller 12.

Both the first and second linkages 60 and 70 may be flexible and the entire main propeller including the propeller mechanism 50 could be molded into a single unitary piece.

During operation of the vehicle 5, the operator will have a remote control unit (not shown) that permits the user to make inputs to the direction of the vehicle 5. The inputs will change the driving torque of the propeller shaft 58. As the driving torque is increased the pitch control linkage 60 twists causing the pitch of one propeller blade to be increased as the pitch of the other propeller blade is decreased. While normally the change in pitch on the blades creates a tip path plane inclination, to counteract the tip path plane inclination, the height control linkage 70 pushes the propeller blade, with the increased pitch, downwards. This counterbalances the increased lifting force on the higher pitched blade and substantially keeps the tip path plane unchanged during the pitching.

Figure 3F:
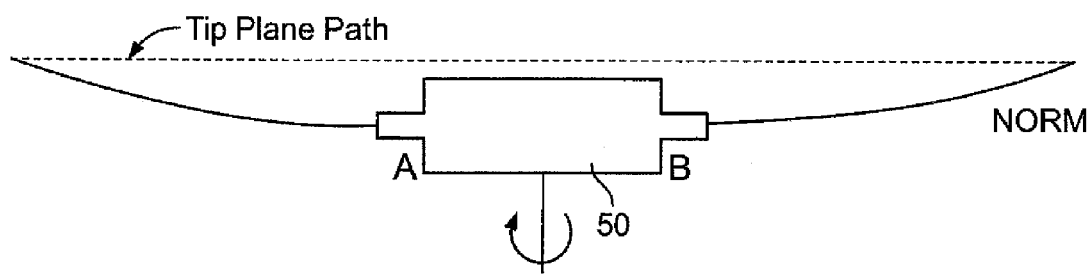
FIGS. 3a through 3c and corresponding FIGS. 3d through 3f, there is shown three views of the main propeller at three various torque positions.

As shown in FIGS. 3a through 3c and FIGS. 3d through 3f, the propeller mechanism 50 is illustrated more clearly. In FIGS. 3a through 3c, the illustrations are viewed looking down onto the bottom of the propeller mechanisms; however, the below descriptions are taken as when the propeller mechanism 50 is attached to a vehicle and are thus described opposite to which they are illustrated.

Figure 3E:
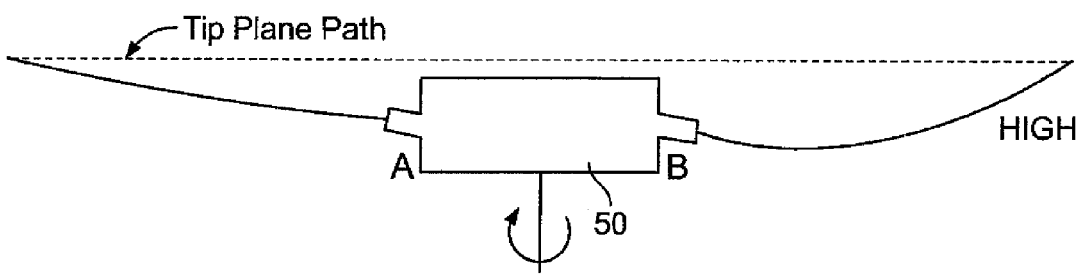
Figure 3D:
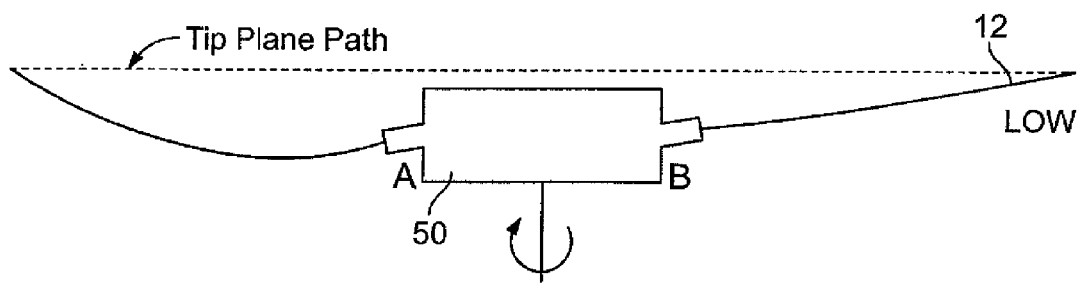

In FIG. 3a and corresponding FIG. 3d the main propeller 12 is in a lower torque state or not running. Blade A is biased slightly lower and at a higher pitch angle than the Blade B. The height control linkage 70 deflects Blade A down to counter an increased pitch while deflecting Blade B up to counter the decreased pitch. This is done such that at a normal torque the two blades are substantially equal in pitch and height thereby provided a hovering state for the vehicle.

The normal torque state is shown in FIG. 3b and corresponding FIG. 3f. In the normal torque state the height and pitch control linkages provide equal height and pitch to both blades.

In FIG. 3c and corresponding FIG. 3e, the main propeller 12 is in a higher torque state, the Blade A has a lower pitch and a higher height then Blade B.

As illustrated in FIGS. 3a through 3c, the pitch control linkage 60 can be seen twisting from one position to the other position. The open region surrounding the pitch control linkage 60 is therefore helpful in allowing the twisting movement.

As the propeller rotates, the propeller blades change positions and the propeller mechanism cycles through the positions to control the vehicle in the specific direction. The present invention further includes a cyclic varying torque that vectors the lifting force away from the center line without substantially inclining the tip path plane. The magnitude and direction of this vectoring is controlled by varying the amplitude and phase of the cyclically varying torque. The cyclically varying torque is created by superimposing a sine wave onto the voltage fed to the motor mechanism. The sine wave is synchronized to the rotational speed of the propeller. The phase and amplitude are controlled to facilitate the desired thrust vector direction and magnitude.

Normally during cyclic pitch inputs used to direct a flying vehicle, the increase in pitch of one of the blades causes the tip of this blade to rise due to increased lift while simultaneously causing the opposite blade to lower due to decreased lift, resulting in a tip path plane inclination. In one or more of the embodiments described herein, the driving torque causes the height and pitch control linkages to work in concert to control the pitch and at the same time counteract the lift on the propeller blade with the increased pitch (by pushing it downwards), while simultaneously counteracting the lowering of the opposite blade (by pushing it upwards), resulting in a substantially unchanged tip path plane during cyclic torque control inputs.

In an aircraft with a non-rotating body such as a helicopter, the driving phase will be controlled relative to the helicopter body. In this situation the system will perform the same function as a swash plate in a standard helicopter. However, in a rotating aircraft, such as illustrated in FIG. 1, the referencing of the phase angle is more complex. Several embodiments are included to describe these referencing systems.

Figure 4A:
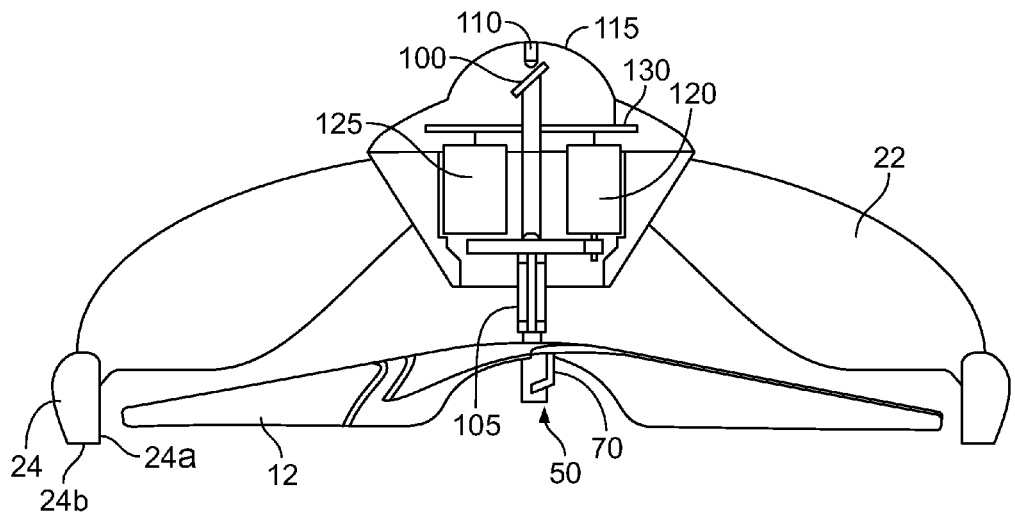
FIGS. 4a and 4b illustrate a controllable flying vehicle in accordance with a first method of control.
Figure 4B:
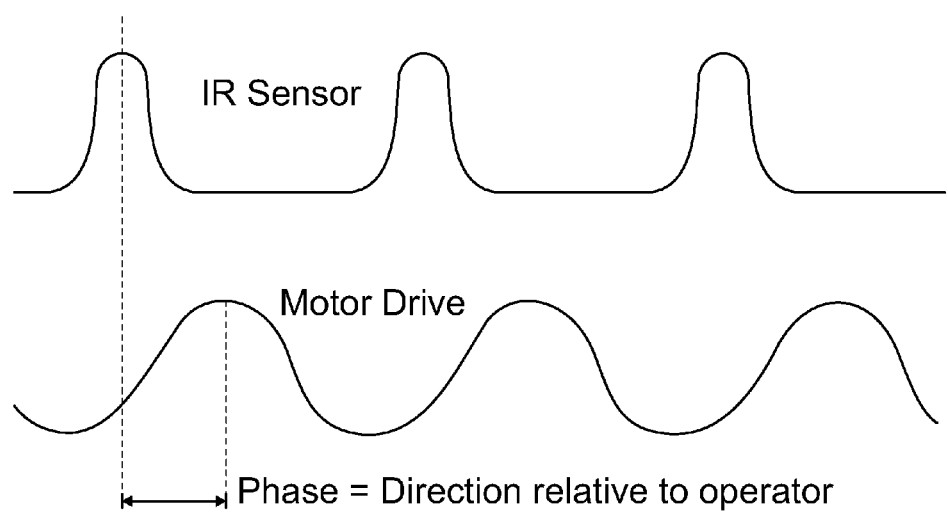

Referring now to FIG. 4a, in a first method a mirror 100 is fixed to the drive shaft 105 that rotates the main propeller 12. The mirror 100 is also inclined to deflect an infra-red beam emitted from an IR emitter 110 in a radially scanning manner in synch with the main propeller 12. The beam emits through a transparent dome 115 and is detected by a controller and the phase is controlled directly in reference to the beam. The drive shaft 105 is driven by a motor 120 that receives power from a power pack 125, all of which is controlled by a circuit board 130. The IR sensor and motor voltage drive is shown in FIG. 4b.

Figure 5A:
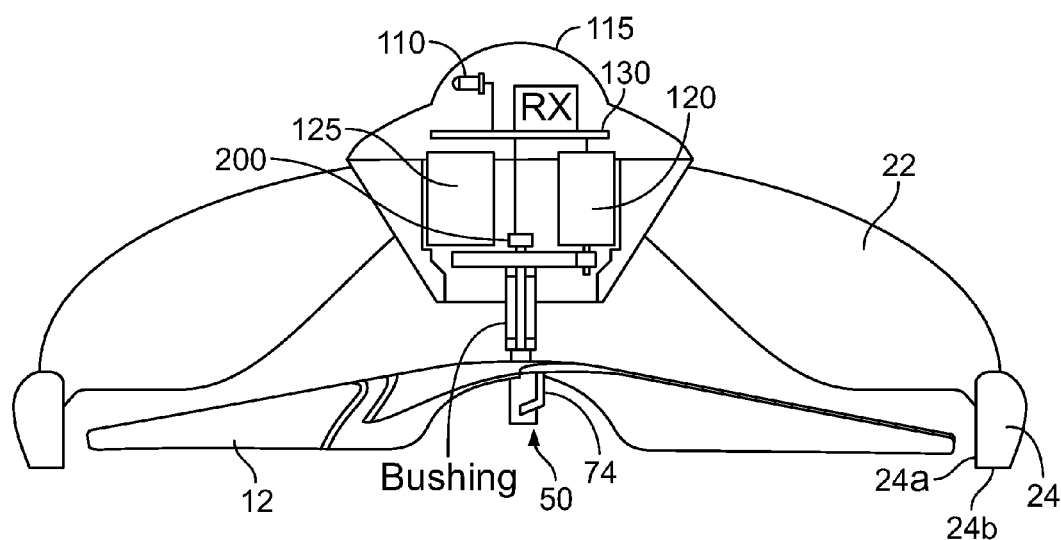
FIGS. 5a and 5b illustrate a controllable flying vehicle in accordance with a second method of control.
Figure 5B:
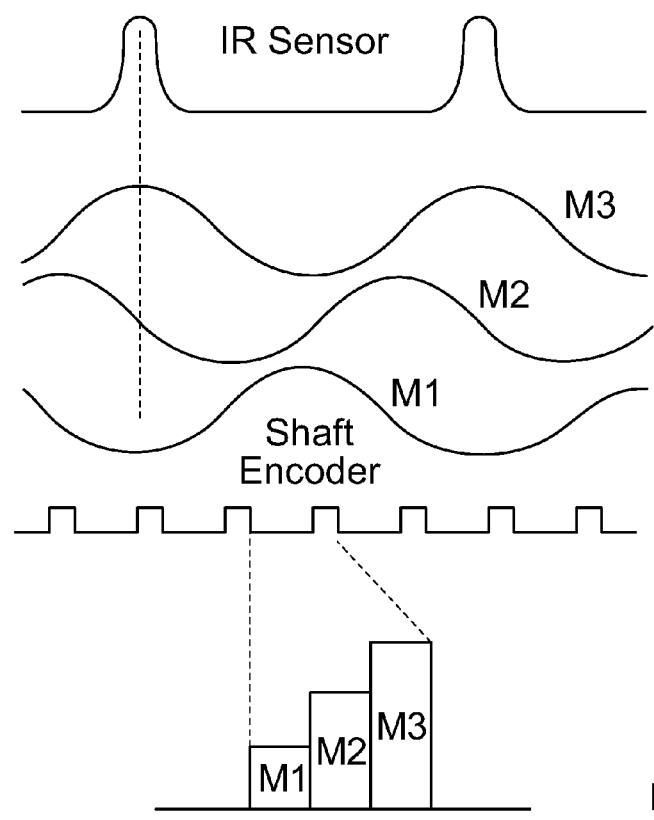

Referring now to FIG. 5a, in a second method a shaft encoder 200 is placed on the drive shaft 105. An infra-red emitter is fixed to the rotating vehicle 5 radiating outwards from the centerline. A controller transmits a three motor drive signal to the vehicle 5. The motor drive values are used to control the magnitude of three virtual segments. These virtual segments are created by dividing the time between the shaft encoder pulses into three equal time slots. This creates a pseudo sine wave with the correct phase and amplitude to drive the vehicle in various directions. FIG. 5b illustrates the three motor drive signals and the shaft encoder time slots and corresponding motor values.

Figure 6A:
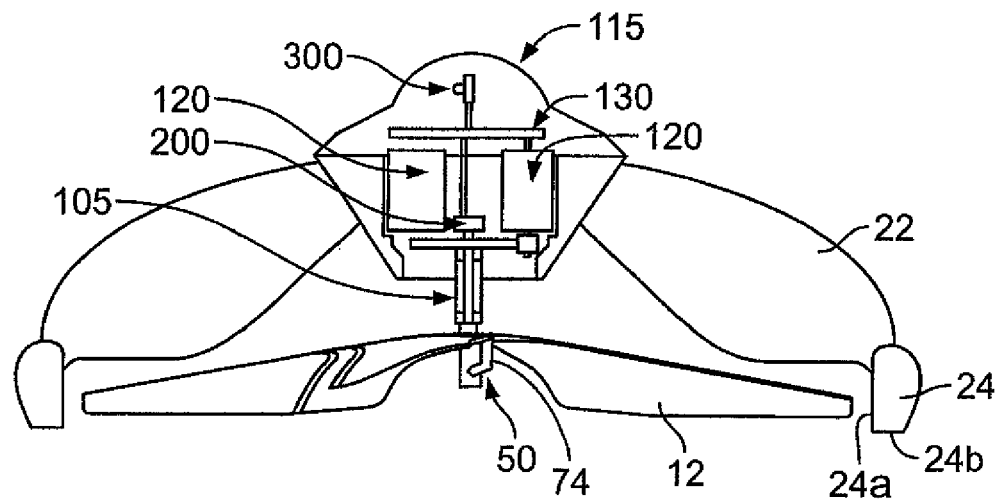
FIGS. 6a and 6h illustrate a controllable flying vehicle in accordance with a third method of control.
Figure 6B:
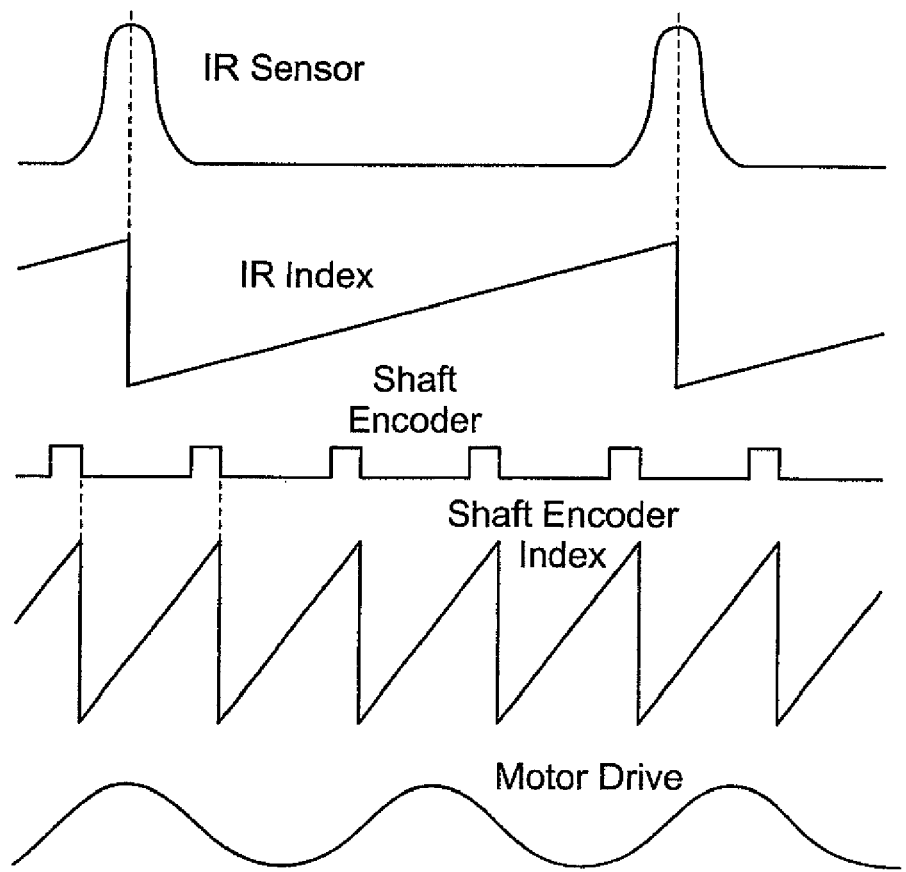

Referring now to FIG. 6a, in a third method a directional infra-red sensor 300 is fixed on the top of the vehicle and rotates with the vehicle 5. A shaft encoder 200 is placed on the drive shaft 105. The shaft encoder signal is used to create the driving sine wave. The rotating sensor is also used to create a ramp of the same number of steps as the sine wave. The ramp is used to control the phase of the sine wave, which creates the correct phase-referenced sine wave to drive the vehicle. FIG. 6b illustrates the IR sensor and IR index ramp, the shaft encoder time slots and shaft encoder index along with the motor drive signal.

It should be further stated the specific information shown in the drawings but not specifically mentioned above may be ascertained and read into the specification by virtue of a simple study of the drawings. Moreover, the invention is also not necessarily limited by the drawings or the specification as structural and functional equivalents may be contemplated and incorporated into the invention without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

In accordance with an embodiment of the present invention there is provided a propeller mechanism to fly an object in a specified direction. The object would at least include a motor for rotating a drive shaft. The propeller mechanism as shown in FIGS. 2b, and 3A through 3C includes a center shaft 58 that connects to the drive shaft of the object. First and second propeller blades (52 & 54) extend away from the center shaft 58. Lastly, a control mechanism is defined to include a first linkage 60 and a second linkage 70. The first propeller blade 52 has an opened region. The opened region is defined to include an opened shaft portion 64 to entirely surround the center shaft 58 and defined to include an opened slot portion 62 that extends away from the opened shaft portion to an internal terminus slot end 63 within the first propeller blade 52 towards a first propeller blade tip A. The first linkage 60 has a pair of first linkage ends 80/82, one first linkage end 80 being positioned within the opened shaft portion 64 and connected to the center shaft 58 and the other first linkage end 82 being connected to the terminus end 63 such that the first linkage 60 is positioned in the opened region and connects the center shaft to the first propeller blade. The second linkage 70 having a substantially "L" shape design includes a first end 72 connected to the center shaft 58 and a second end 74 connected to an edge 76 defined along a central region on the first propeller blade 52. Therefore, a change in a driving torque of the drive shaft causes the first linkage and the second linkage to work in concert to change the pitch and height of both the first and second propeller blades while substantially unchanging a tip path plane of the first and second propeller blades.

I claim:

1. A propeller mechanism to fly an object in a specified direction, having a motor for rotating a drive shaft, comprising:
    a center shaft for connecting to the drive shaft;
    first and second propeller blades extending away from the center shaft;
    a control mechanism defined to include a first linkage and a second linkage;
    the first propeller blade having an opened region, the opened region defined to include an opened shaft portion to entirely surround the center shaft and defined to include an opened slot portion that extends away from the opened shaft portion to an internal terminus slot end within the first propeller blade towards a first propeller blade tip;
    the first linkage having a pair of first linkage ends, one first linkage ends being positioned within the opened shaft portion and connected to the center shaft and the other first linkage end being connected to the internal terminus slot end such that the first linkage is positioned in the opened region and connects the center shaft to the first propeller blade; and
    the second linkage having a substantially "L" shape design and includes a first end connected to the center shaft and a second end connected to an edge defined along a central region on the first propeller blade, whereby
    a change in a driving torque of the drive shaft causes the first linkage and the second linkage to work in concert to change the pitch and height of both the first and second propeller blades while substantially unchanging a tip path plane of the first and second propeller blades.

2. The propeller control mechanism of claim 1, wherein the first and second linkages are flexible.

3. The propeller control mechanism of claim 1, wherein the first and second propeller blades and the first and second linkages and all defined from a unitary piece of material.

* * * * *